US008518332B2

(12) United States Patent
Sato et al.

(10) Patent No.: US 8,518,332 B2
(45) Date of Patent: Aug. 27, 2013

(54) AIR POLLUTION CONTROL APPARATUS AND AIR POLLUTION CONTROL SYSTEM

(75) Inventors: Toshihiro Sato, Nagasaki (JP);
Nobuyasu Sakata, Nagasaki (JP);
Rikuma Shijo, Nagasaki (JP);
Moritoshi Murakami, Hiroshima (JP);
Nobuyuki Ukai, Hiroshima (JP);
Katsumi Nochi, Hiroshima (JP);
Masashi Kiyosawa, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 290 days.

(21) Appl. No.: 13/003,956

(22) PCT Filed: Jul. 23, 2009

(86) PCT No.: PCT/JP2009/063195
§ 371 (c)(1),
(2), (4) Date: Jan. 13, 2011

(87) PCT Pub. No.: WO2010/016393
PCT Pub. Date: Feb. 11, 2010

(65) Prior Publication Data
US 2011/0116981 A1    May 19, 2011

(30) Foreign Application Priority Data
Aug. 7, 2008   (JP) .................................. 2008-204708

(51) Int. Cl.
*B01D 50/00*    (2006.01)
(52) U.S. Cl.
USPC ........................................ 422/176; 422/180
(58) Field of Classification Search
USPC .................... 422/176, 177, 180, 168
See application file for complete search history.

(56) References Cited

U.S. PATENT DOCUMENTS

| 5,043,146 | A | * | 8/1991 | Ishikawa et al. | ............... 422/176 |
| 5,916,134 | A | * | 6/1999 | Yang et al. | ....................... 60/299 |

(Continued)

FOREIGN PATENT DOCUMENTS

| CN | 1420800 A | 5/2003 |
| EP | 0860197 A1 | 8/1998 |
| EP | 1932579 A1 | 6/2008 |
| JP | 6-241036 A | 8/1994 |
| JP | 10-230137 A | 9/1998 |
| JP | 2001-198434 A | 7/2001 |
| JP | 2002-143693 A | 5/2002 |
| WO | 00/02657 A1 | 1/2000 |
| WO | 01/28665 A1 | 4/2001 |

OTHER PUBLICATIONS

Japanese Office Action dated Aug. 23, 2011, issued in corresponding Japanese Application No. 2008-204708.

(Continued)

*Primary Examiner* — Tom Duong
(74) *Attorney, Agent, or Firm* — Westerman, Hattori, Daniels & Adrian, LLP

(57) ABSTRACT

An air pollution control apparatus 10 according to an embodiment of the present invention has a denitration catalyst layer 13 that removes NOx in flue gas 12, and atomizes HCl into the flue gas 12 to oxidize Hg, and also includes a swirling-flow generating member 30A that includes a swirling-flow generating-member body being partitioned to correspond to each passage of the denitration catalyst layer 13 and a plurality of swirling-flow generating vanes arranged on the partition inner walls to generate a turbulent flow, on an inlet 13*a* side of the denitration catalyst layer 13. With this configuration, a laminar flow of the flue gas 12 in a flue gas duct 19 is changed to a swirling flow, thereby enabling to increase a contact time between the flue gas 12 and a denitration catalyst and to improve the oxidation reaction efficiency between Hg in the flue gas 12 and the denitration catalyst.

5 Claims, 8 Drawing Sheets

(56) References Cited

U.S. PATENT DOCUMENTS

| | | |
|---|---|---|
| 6,534,022 B1 | 3/2003 | Carlborg et al. |
| 6,638,485 B1 | 10/2003 | Iida et al. |
| 2003/0180205 A1 | 9/2003 | Carlborg et al. |

OTHER PUBLICATIONS

International Search Report of PCT/JP2009/063195, mailing date Oct. 20, 2009.
Written Opinion of PCT/JP2009/063195, mailing date Oct. 20, 2009.
Canadian Office Action dated Feb. 8, 2012, issued in corresponding Canadian Patent Application No. 2,729,664.
Extended European Search Report dated Jul. 30, 2012, issued in corresponding European patent application 09804880.4.
Ku Rose, Ryoichi, et al., "Effect of Flow Behavior on Degradation of De-NOx Catalyst", Journal of the Japan Institute of Energy, 85, p. 471-474 (2006); cited in Extended European Search Report dated Jul. 30, 2012.
Chinese Office Action dated Dec. 5, 2012, issued in corresponding Chinese patent application No. 200980128323.6, w/ English translation.
Canadian Office Action dated Apr. 8, 2013, issued in corresponding Canadian Patent Application No. 2,729,664 (1 page).

\* cited by examiner

AIR POLLUTION CONTROL APPARATUS AND AIR POLLUTION CONTROL SYSTEM

FIELD

The present invention relates to an air pollution control apparatus and an air pollution control system that process flue gas discharged from a combustion device.

BACKGROUND

Because mercury having high toxicity is included in flue gas discharged from a coal combustion boiler, which is a combustion device, for example, in a thermal power plant, various systems for removing mercury in flue gas have been conventionally studied.

Generally, a wet type desulfurizer for removing sulfur contents in flue gas is provided in the coal combustion boiler. In a flue-gas processing plant where a desulfurizer is attached to the boiler as an air pollution control apparatus, it is well known that if chlorine (Cl) contents in flue gas increase, the percentage of divalent metallic mercury (Hg) soluble in water increases, and thus the desulfurizer can easily collect mercury.

Recently, therefore, various processing methods and processing apparatuses of metallic mercury have been devised by combining NOx removal unit that reduces NOx and a wet type desulfurizer that uses an alkaline absorbent as a sulfur oxide (SOx) absorbent.

As a method of processing metallic mercury in flue gas, a removal method using an adsorbent such as activated carbon or a selenium filter has been known. However, this method requires a special adsorption removal unit, and thus it is not suitable for processing of large-capacity flue gas such as flue gas from a power plant.

Therefore, as a method of processing metallic mercury in large-capacity flue gas, there has been proposed a method such that a chlorinating agent is gas-atomized on an upstream side of NOx removal unit at a high temperature in a flue gas duct, mercury is oxidized (chlorinated) on a denitration catalyst to prepare soluble mercury chloride, and the mercury chloride is absorbed in a wet desulfurizer installed on a downstream side (see, for example, Patent Literatures 1 and 2). Further, an apparatus that atomizes gas to a flue gas duct and a technique therefor have been put to practical use in atomization of $NH_3$ by NOx removal unit and gas atomization of the chlorinating agent.

FIG. 8 is a schematic diagram of an air pollution control system of a coal combustion boiler. As shown in FIG. 8, a conventional air pollution control system 100 includes a denitration catalyst layer 13 that removes nitrogen oxides (NOx) in flue gas 12 from a coal combustion boiler 11 that supplies coal as a fuel, and atomizes hydrochloric acid (HCl) into the flue gas 12 to oxidize mercury (Hg), an air preheater 14 that recovers heat in the flue gas 12 after removal of nitrogen oxides (NOx), an electronic precipitator 15 that removes dust in the flue gas 12 after heat recovery, a desulfurizer 16 that removes sulfur oxides (SOx) and mercury (Hg) in the flue gas 12 after dust removal, and a stack 18 that discharges the flue gas 12 that has undergone desulfurization to the outside as purged gas 17.

Further, an injection spot of hydrochloric acid (HCl) is provided in a flue gas duct 19 on an upstream side of the denitration catalyst layer 13, and hydrochloric acid (liquid) stored in a hydrochloric acid (liquid HCl) supplying unit 20 is gasified in a hydrogen chloride (HCl) atomizing unit 21 and atomized to the flue gas 12 as hydrogen chloride via a hydrogen chloride (HCl) atomizing nozzle 22.

Further, an injection spot of ammonia ($NH_3$) is provided in the flue gas duct 19 on an upstream side of the denitration catalyst layer 13, and ammonia ($NH_3$) supplied from an ammonia ($NH_3$) supplying unit 23 is atomized to the flue gas 12 by an ammonia ($NH_3$) atomizing nozzle 24, to reduce NOx.

In FIG. 8, reference numerals 25 and 26 denote an oxidation-reduction potential controller (ORP controller) and air, respectively.

The flue gas 12 from the boiler 11 is supplied to the denitration catalyst layer 13 and supplied to the electronic precipitator 15 after having heated air 27 by heat exchange in the air preheater 14, and further supplied to the desulfurizer 16, and then discharged to the air as the purged gas 17.

To suppress the influence of the chlorinating agent on an apparatus such as corrosive breakage and improve the reliability of the apparatus, the mercury concentration in flue gas, which has undergone wet desulfurization, is measured by a mercury monitor, and a feed rate of the chlorinating agent is adjusted based on the mercury concentration after desulfurization (see, for example, Patent Literature 2).

In this manner, conventionally, NOx in the flue gas 12 is removed and Hg in the flue gas 12 is oxidized by supplying hydrogen chloride and ammonia into the flue gas 12.

That is, $NH_3$ is used for reduction and denitration of NOx, and $NH_3$ supplied from the $NH_3$ supplying unit 23 is atomized into the flue gas 12 via the $NH_3$ atomizing nozzle 24. In the denitration catalyst layer 13, NOx is substituted by nitrogen ($N_2$) by a reduction reaction as shown in the following equations, and then denitrated.

$$4NO+4NH_3+O_2 \rightarrow 4N_2+6H_2O \quad (1)$$

$$NO+NO_2+2NH_3 \rightarrow 2N+3H_2O \quad (2)$$

Hydrogen chloride is used for mercury oxidation, and the hydrogen chloride used as the chlorinating agent is supplied from the liquid HCl supplying unit 20 to the HCl atomizing unit 21, where hydrochloric acid is gasified, and atomized into the flue gas 12 as HCl by the HCl atomizing nozzle 22. Accordingly, in the denitration catalyst layer 13, Hg having low solubility is oxidized (chlorinated) on the denitration catalyst as shown in the following equation, and converted to highly soluble mercury chloride ($HgCl_2$), thereby removing Hg contained in the flue gas 12 by the desulfurizer 16 provided on a downstream side.

$$Hg+2CHl+½O_2 \rightarrow HgCl_2+H_2O \quad (3)$$

Further, when coal or heavy oil is used as a fuel, because Cl is contained in the fuel, combustion gas contains Cl components. However, the content of the Cl components in the fuel varies depending on the type of fuel, and thus it is difficult to control the Cl concentration in flue gas. Therefore, it is desired that HCl and the like in an amount more than required is added to the flue gas on an upstream side of an air pollution control apparatus 10 to remove mercury reliably.

Further, as the denitration catalyst layer 13, as shown in FIG. 7, a layer in which a denitration catalyst is supported on a honeycomb layer having square passages 28 arranged in a reticular pattern is used, and a cross-sectional shape of the passage is a multangular shape such as triangle or square.

CITATION LIST

Patent Literature

Patent Literature 1: Japanese Patent Application Laid-open No. H10-230137
Patent Literature 2: Japanese Patent Application Laid-open No. 2001-198434

SUMMARY

Technical Problem

An air current of the flue gas 12 supplied to the conventional denitration catalyst layer 13 is rectified by a rectifying unit (not shown) just before the denitration catalyst layer 13 to be in a laminar flow state, and flows into the honeycomb passages 28 in the denitration catalyst layer 13 in this state. Therefore, a contact area between the denitration catalyst and flue gas is limited, and as a result, it is difficult to further improve the oxidation reaction efficiency of mercury.

The present invention has been achieved to solve the above problems, and an object of the present invention is to provide an air pollution control apparatus and an air pollution control system that can increase a contact area between flue gas supplied into NOx removal unit and a denitration catalyst to further improve the oxidation reaction efficiency of mercury in the flue gas.

Solution to Problem

According to an aspect of the present invention, an air pollution control apparatus includes at least one denitration catalyst layer that removes nitrogen oxides in flue gas from a boiler and atomizes hydrogen chloride into a flue gas duct of the flue gas to oxidize mercury. A swirling-flow generating member is provided at an inlet of the denitration catalyst layer to change a laminar flow of flue gas in a flue gas duct to a swirling flow inside the denitration catalyst layer.

Advantageously, in the air pollution control apparatus, the denitration catalyst layer is a honeycomb catalyst, and the swirling-flow generating member includes a swirling-flow generating-member body being partitioned to correspond to each passage at an inlet of the honeycomb catalyst, and a plurality of swirling-flow generating vanes arranged on the partition inner walls to generate a turbulent flow.

Advantageously, in the air pollution control apparatus, the swirling-flow generating vanes provided on the inner walls form a set, and a plurality of sets are arranged in a direction of a gas flow, while being offset.

Advantageously, in the air pollution control apparatus, the denitration catalyst layer is provided at a plurality of stages along a flow direction of the flue gas, and the swirling-flow generating member is arranged at each of the stages.

According to another aspect of the present invention, an air pollution control system includes: the boiler; a chlorinating-agent supplying unit that injects a chlorinating agent into flue gas discharged to a flue gas duct on a downstream side of the boiler; the air pollution control apparatus according to any one of claims 1 to 4; a NOx removal unit that removes sulfur oxides in flue gas after denitration; and a stack that discharges denitrated gas to outside.

Advantageously, in the air pollution control system, an ammonia supplying unit that injects ammonia into flue gas discharged to a flue gas duct on a downstream side of the boiler is provided.

Advantageous Effects of Invention

According to the present invention, the swirling-flow generating member is provided at an inlet of the denitration catalyst layer that removes nitrogen oxides in flue gas from a boiler to change a laminar flow of flue gas in the flue gas duct to a swirling flow in the denitration catalyst layer. Therefore, a contact time between the flue gas and the denitration catalyst can be increased.

Therefore, the oxidation reaction efficiency between mercury in the flue gas and the denitration catalyst can be improved by supplying HCl beforehand into the flue gas. With this configuration, mercury in the flue gas can be removed highly efficiently by the NOx removal unit provided on a downstream side of the air pollution control apparatus.

Further, because reduction performance of NOx and oxidation performance of mercury in flue gas can be improved, an amount of denitration catalyst used in the denitration catalyst layer can be reduced, and a feed rate of the chlorinating agent supplied to the flue gas can be also reduced.

BRIEF DESCRIPTION OF DRAWINGS

FIG. 5 is a schematic diagram of an air pollution control system including a configuration of the air pollution control apparatus according to the embodiment of the present invention or the like.

DESCRIPTION OF EMBODIMENTS

Exemplary embodiments of the present invention will be explained below in detail with reference to the accompanying drawings. The present invention is not limited to the embodiments. In addition, constituent elements in the following embodiments include those that can be easily assumed by persons skilled in the art or that are substantially equivalent.

Embodiment

An air pollution control system that applies the air pollution control apparatus according to an embodiment of the present invention is explained with reference to the drawings.

Figure 8:
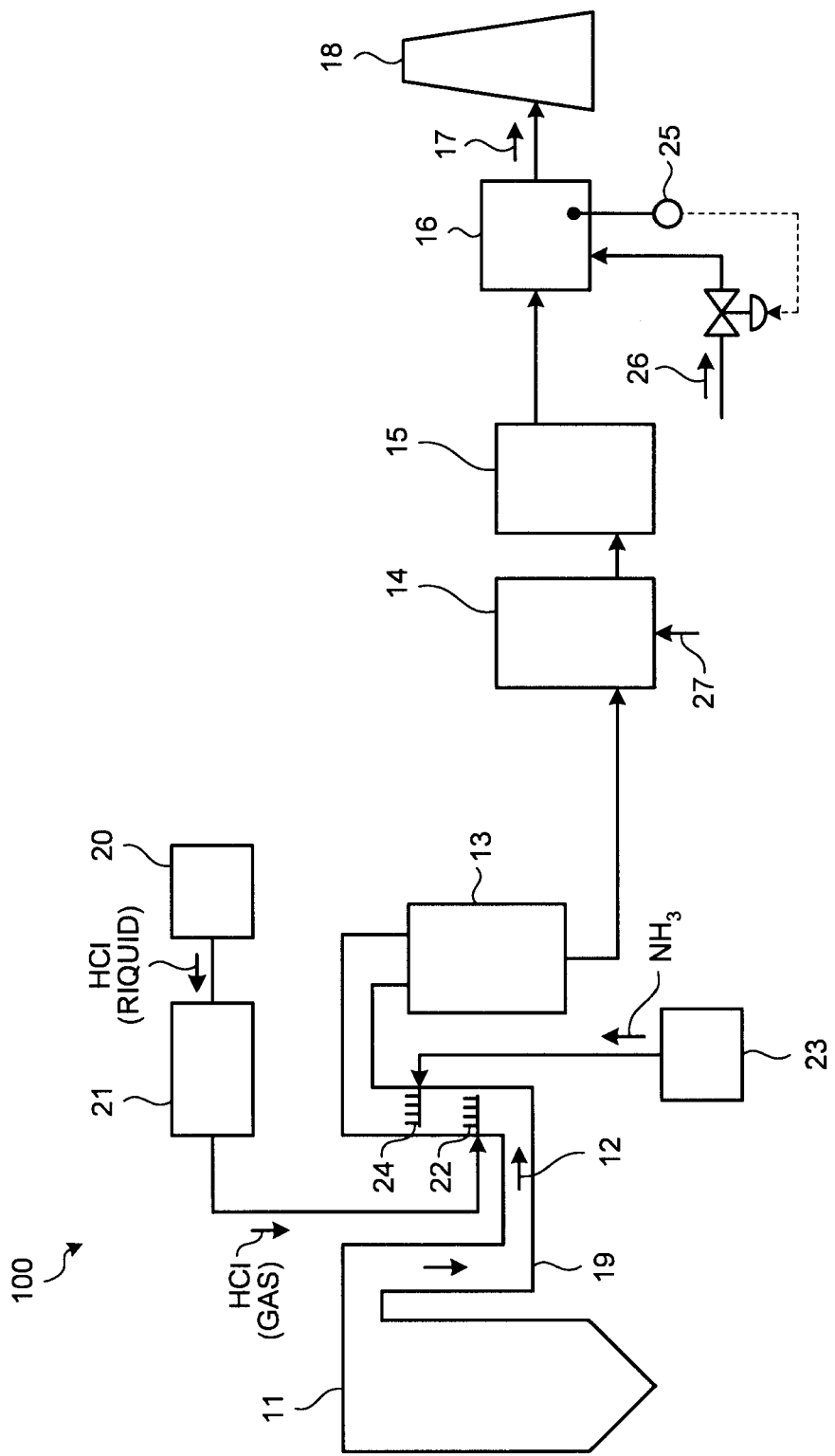
FIG. 8 is a schematic diagram of an air pollution control system of a coal combustion boiler.

The configuration of the air pollution control system applying the air pollution control apparatus according to the present embodiment is identical to the configuration of the air pollution control system shown in FIG. 8.

Therefore, in the present embodiment, only the configuration of the air pollution control apparatus is explained.

Figure 1:
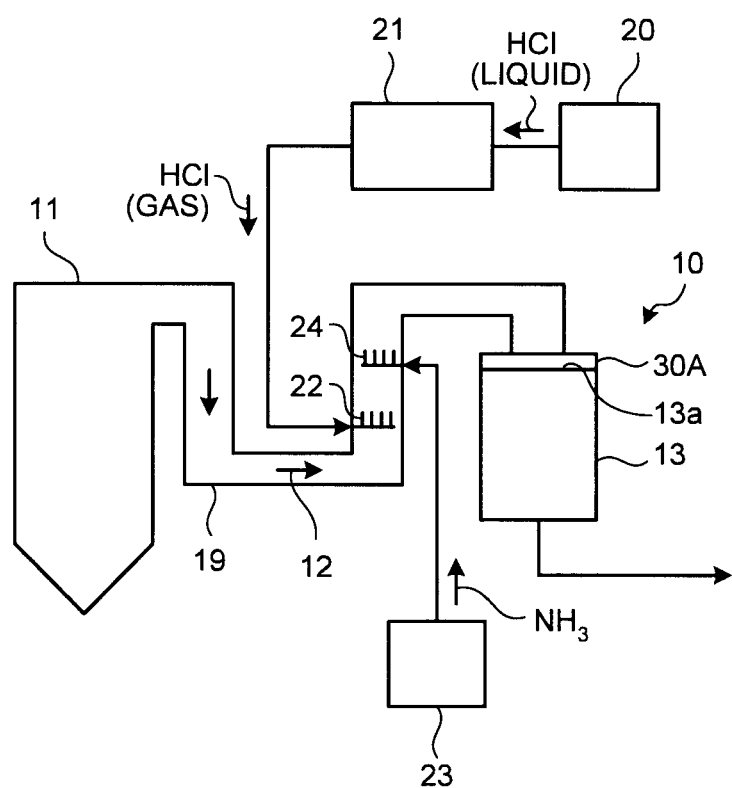
FIG. 1 is a schematic diagram of an air pollution control apparatus according to an embodiment of the present invention.
Figure 2:
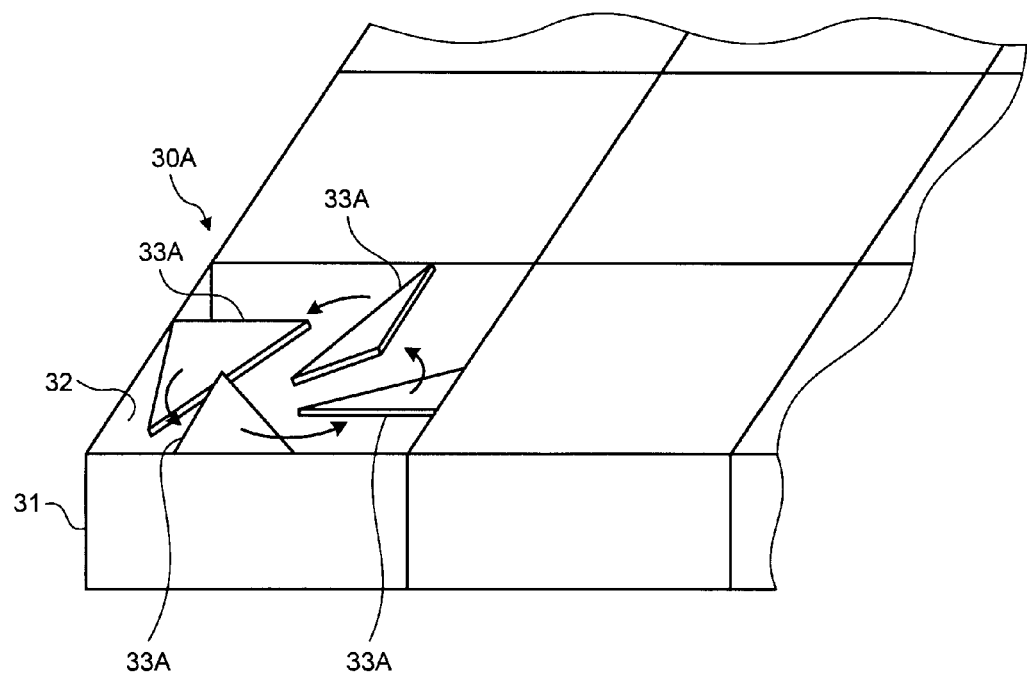
FIG. 2 is a perspective view of a swirling-flow generating member.
Figure 3:
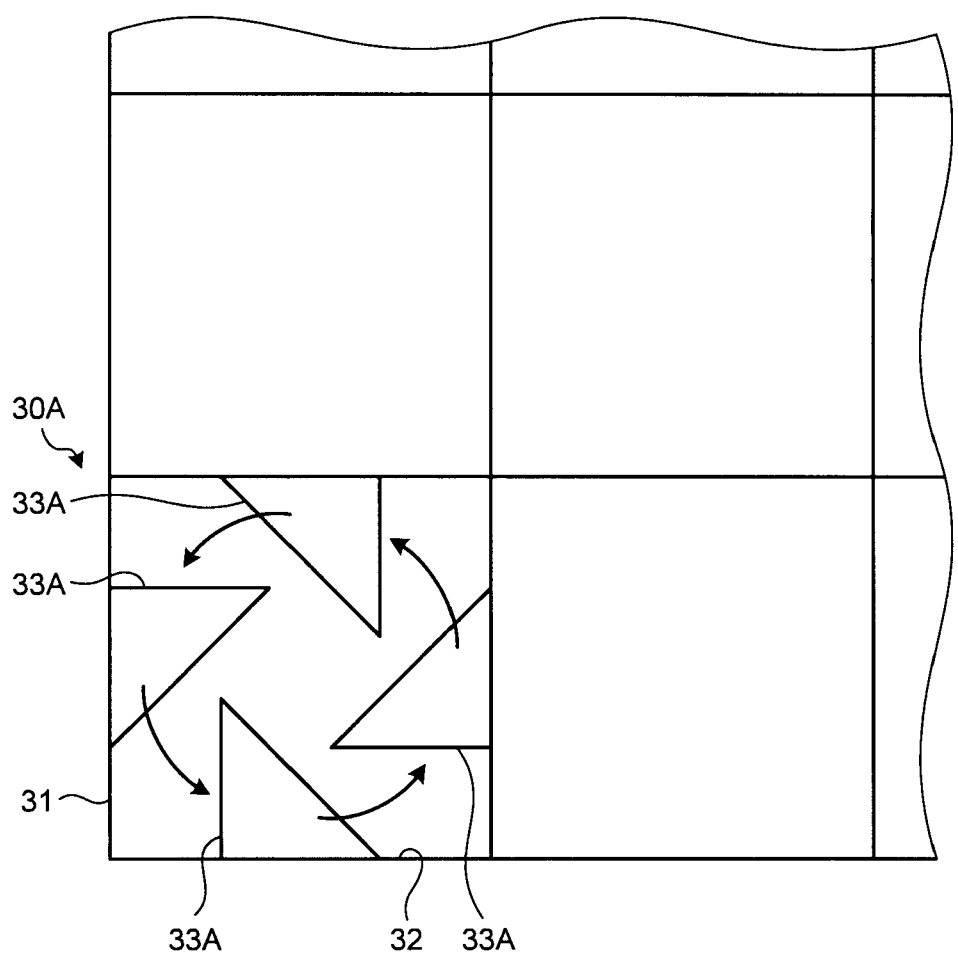
FIG. 3 depicts the swirling-flow generating member as viewed from an axial direction.

FIG. 1 is a schematic diagram of an air pollution control apparatus according to the embodiment, FIG. 2 is a perspective view of a swirling-flow generating member, and FIG. 3 depicts the swirling-flow generating member as viewed from an axial direction.

The configuration shown in FIG. 1 is a part of the air pollution control system shown in FIG. 8, and thus like reference numerals are denoted to like members in the conventional configuration and redundant explanations thereof will be omitted.

As shown in FIG. 1, the air pollution control apparatus 10 according to the present embodiment includes at least one denitration catalyst layer 13 in which nitrogen oxides in the flue gas 12 from the boiler 11 is removed, and hydrogen chloride is atomized into the flue gas duct 19 of the flue gas 12 to oxidize mercury. A swirling-flow generating member 30A is provided at an inlet of the denitration catalyst layer 13, to change a laminar flow of the flue gas 12 in the flue gas duct 19 to a swirling flow inside the denitration catalyst layer 13.

As shown in FIGS. 2 and 3, the swirling-flow generating member 30A includes a swirling-flow generating-member body 31 being partitioned to correspond to each passage at an inlet of the honeycomb catalyst, and a plurality of swirling-flow generating vanes 33A arranged on the partition inner walls 32 to generate a turbulent flow.

The swirling-flow generating vanes 33A are triangular plate members in the present embodiment, and are arranged with one side thereof being inclined in the same direction along the inner wall 32.

In the drawings, the swirling-flow generating vanes 33A are respectively provided in each passage, but not shown in the drawings.

In the present embodiment, the number of swirling-flow generating vanes 33A is four corresponding to the inner walls 32; however, the present invention is not limited thereto, and two or three, or five or more swirling-flow generating vanes can be provided. The number of swirling-flow generating vanes 33A can be appropriately changed according to the shape of the passage of the honeycomb catalyst.

In the present embodiment, because the swirling-flow generating member 30A including the swirling-flow generating-member body 31 being partitioned to correspond to each passage on an inlet 13a side of the denitration catalyst layer 13, and the swirling-flow generating vanes 33A arranged on the partition inner walls 32 to generate a turbulent flow is provided on the inlet 13a side of the denitration catalyst layer 13, a laminar flow of the flue gas 12 in the flue gas duct 19 can be changed to a swirling flow inside the denitration catalyst layer 13 to increase the contact time between the flue gas 12 and the denitration catalyst. Accordingly, because HCl is supplied into the flue gas 12 beforehand, the oxidation reaction efficiency between Hg in the flue gas 12 and the denitration catalyst can be improved.

With this configuration, Hg in the flue gas 12 can be removed highly efficiently by the desulfurizer (not shown) provided on a downstream side of the air pollution control apparatus 10.

Because reduction performance of NOx and oxidation performance of mercury in the flue gas 12 can be improved, an amount of denitration catalyst used in the denitration catalyst layer 13 can be reduced, and an HCl amount supplied to the flue gas 12 can be also reduced.

Figure 7:
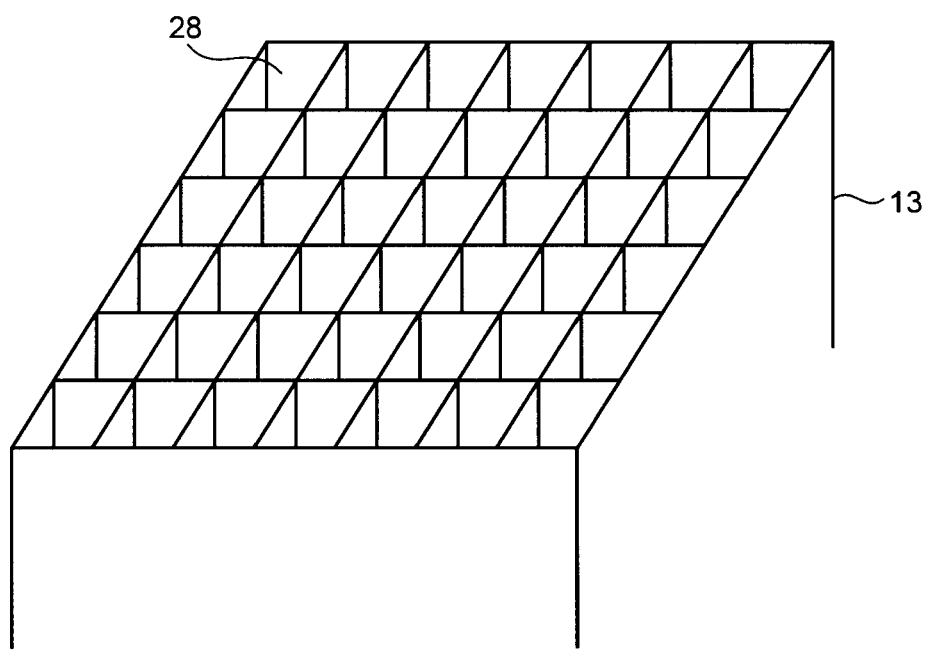
FIG. 7 is perspective view of a honeycomb catalyst.

Conventionally, as shown in FIG. 7, the size of cross section of the passages 28 of the honeycomb catalyst in the denitration catalyst layer 13 is generally as narrow as 5 millimeters square in order to improve the contact efficiency between the flue gas 12 and the denitration catalyst and reduce pressure loss in the flue gas 12.

On the other hand, in the present invention, the swirling-flow generating member 30A is provided corresponding to a honeycomb passage, and a length of one side of each of the passages 28 in the denitration catalyst layer 13 can be increased to 5 millimeters or more, and for example, and opening therof can be set to 6 to 10 millimeters square, in order to improve the contact efficiency between the flue gas 12 and the denitration catalyst and to reduce pressure loss in the flue gas 12.

An inclination angle of the swirling-flow generating vane 33A along the inner wall 32 corresponds to a flow rate of the flue gas 12, and can be an angle capable of changing the flue gas 12 to a turbulent flow.

Further, a plurality of sets of swirling-flow generating vanes 33A can be provided along a gas flow with a predetermined gap therebetween, assuming that four swirling-flow generating vanes 33A arranged in the passage are one set.

Figure 4:
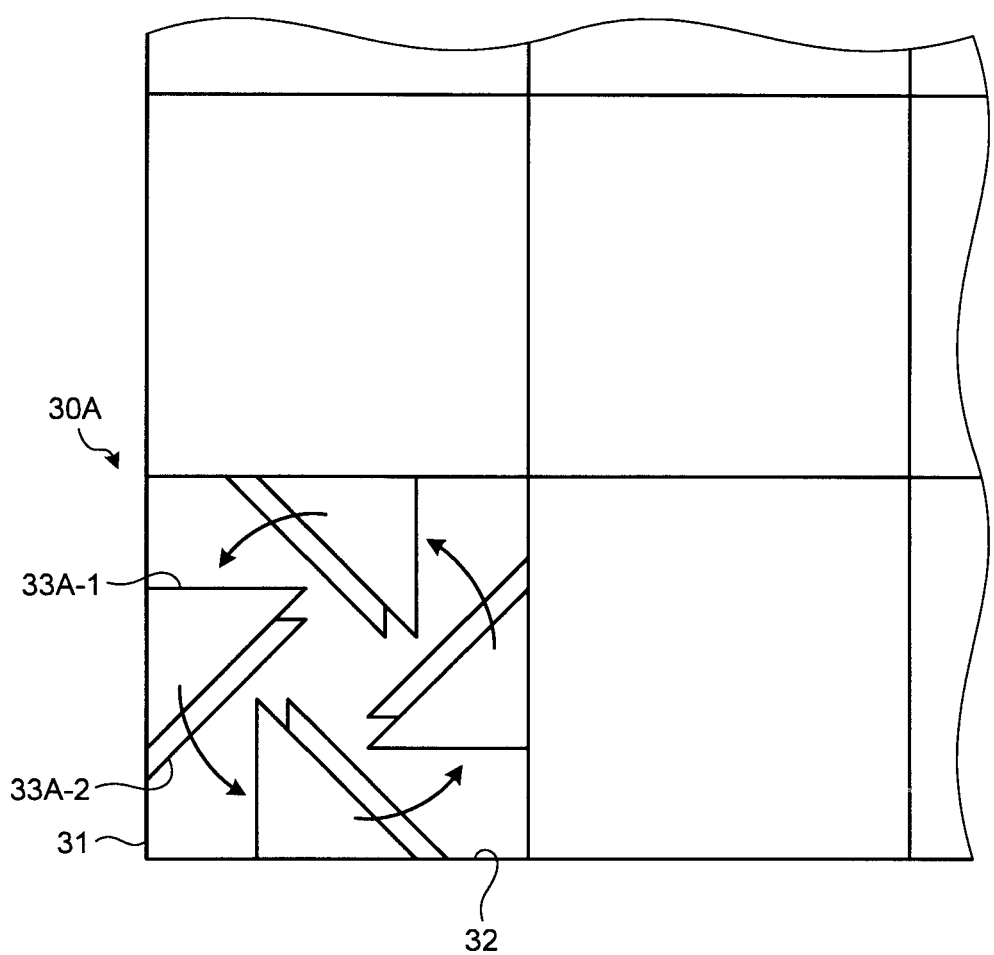
FIG. 4 depicts another swirling-flow generating member as viewed from an axial direction.

As shown in FIG. 4, a plurality of swirling-flow generating vanes 33A can be provided in such a manner that a set of swirling-flow generating vanes 33A-2 provided on a downstream side along a direction of a gas flow are offset so that a part thereof does not overlap on a set of swirling-flow generating vanes 33A-1 provided on an upstream side of the flue gas 12. With this configuration, a swirling flow can be generated in the flue gas 12 more efficiently.

The set of swirling-flow generating vanes 33A-2 provided on a downstream side of the flue gas 12 can be provided in a plurality of numbers on the inner wall 32 of the swirling-flow generating-member body 31 so that the set of swirling-flow generating vanes 33A-2 overlaps on the set of swirling-flow generating vanes 33A-1 provided on an upstream side of the flue gas 12, as viewed from an axial direction of the swirling-flow generating-member body 31.

Figure 5:
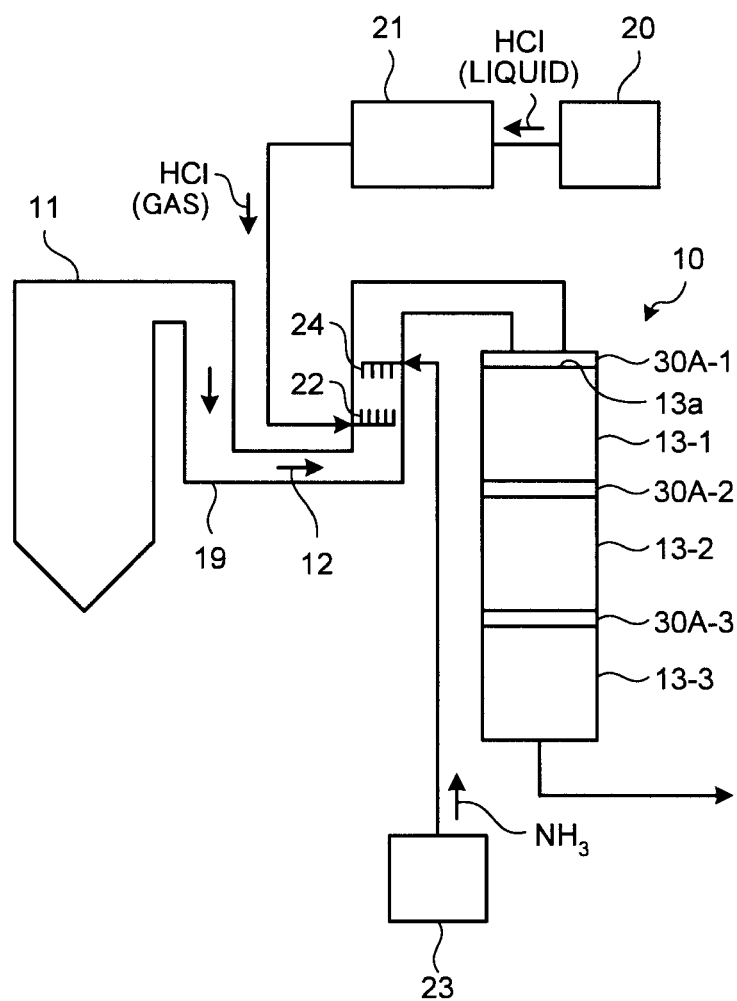

In the air pollution control apparatus 10 according to the present embodiment, only one denitration catalyst layer 13 is arranged. However, the present invention is not limited thereto, and as shown in FIG. 5, a plurality of (three in the present embodiment) denitration catalyst layers 13-1 to 13-3 can be arranged along a flow direction of the flue gas 12 in the flue gas duct 19. At this time, swirling-flow generating members 30A-1 to 30A-3 can be provided at each inlet of the denitration catalyst layers 13-1 to 13-3, to generate the flue gas 12 more efficiently.

Figure 6:
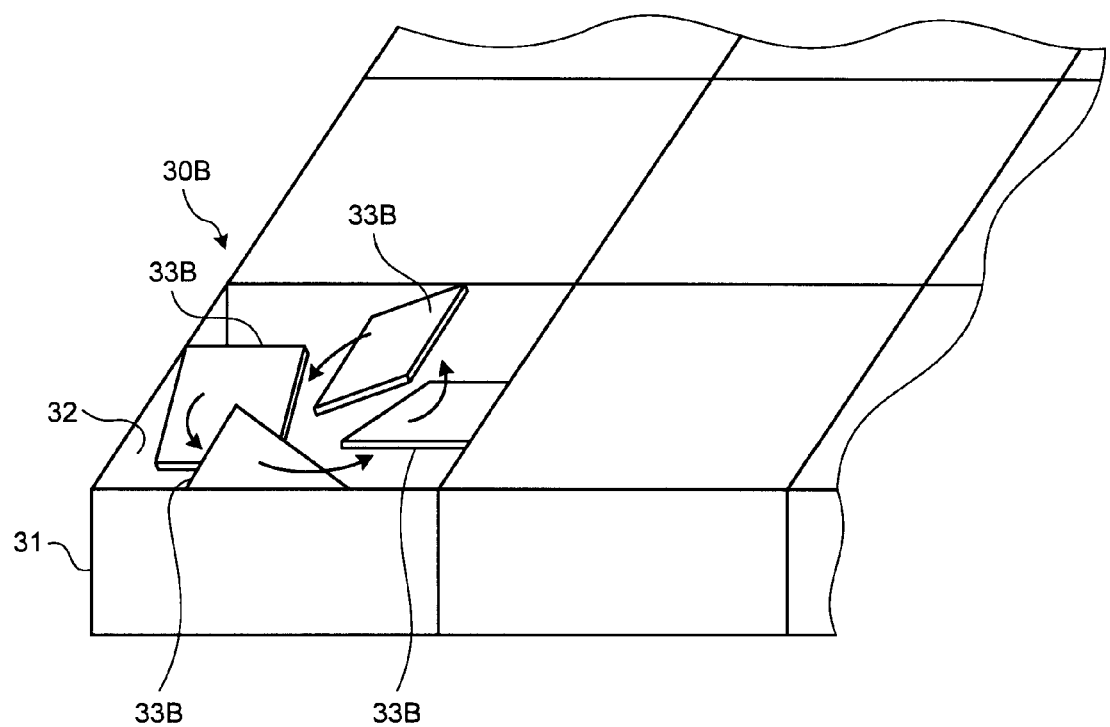
FIG. 6 depicts another swirling-flow generating member as viewed from an axial direction.

Further, in the present embodiment, the cross-sectional shape of the swirling-flow generating vanes 33A of the swirling-flow generating member 30A is triangle. However, the present invention is not limited thereto, and as shown in FIG. 6, square swirling-flow generating vanes 33B can be used, with one side thereof being arranged inclined in the same direction along the inner wall 32.

In the air pollution control apparatus 10 according to the present embodiment, as the denitration catalyst used in the denitration catalyst layer 13 for reduction and denitration, metal oxides such as V, W, Mo, Ni, Co, Fe, Cr, Mn, and Cu, or sulfate, or noble metals such as Pt, Ru, Rh, Pd, and Ir, or one in which a mixture thereof is supported on a carrier such as titania, silica, zirconia, complex oxides thereof, or zeolite can be used.

In the present embodiment, although there is no particular limitation on the concentration of HCl to be used, for example, from concentrated hydrochloric acid to dilute hydrochloric acid of about 5% can be used. In the present embodiment, hydrogen chloride (HCl) is explained as the chlorinating agent to be used. However, the present invention is not limited thereto, and the chlorinating agent can be an agent in which Hg in flue gas reacts in the presence of a denitration catalyst to generate HgCl and/or $HgCl_2$. As such a chlorinating agent, ammonium chloride, chlorine, hypochlorous acid, ammonium hypochlorite, chlorite, ammonium chlorite, chlonic acid, ammonium chlorate, perchloric acid, ammonium perchlorate, amine salts of above acids, and other salts can be exemplified.

The amount of chlorinating agent to be added in the flue gas 12 can be a stoichiometric amount or more with respect to poorly water-soluble Hg. As the concentration of the chlorinating agent in the flue gas 12 in the flue gas duct 19, the chlorinating agent can be atomized in an amount of 1000 ppm or less with respect to the flue gas 12, taking into consideration efficient removal of Hg in the flue gas 12 and the concentration of chlorine in discharged water discharged on a downstream side.

A mixing position of HCl with the flue gas 12 in the flue gas duct 19 is set to be on an upstream side of a mixing position of $NH_3$; however, it can be on a downstream side of the mixing position of $NH_3$.

In the present embodiment, both the $HC_1$ and $NH_3$ are added to the flue gas 12 discharged from the boiler 11. However, $NH_3$ may not be added to the flue gas 12 in the flue gas duct 19. It is because the denitration catalyst layer 13 in the air pollution control apparatus 10 is for removing NOx in the flue gas 12 and oxidizing Hg in the flue gas 12 to remove Hg by the desulfurizer (not shown) provided on a downstream side, and there is the same effect of removing Hg by the desulfurizer (not shown) by converting Hg to chlorides by HCl in the presence of the denitration catalyst in the denitration catalyst layer 13, even if $NH_3$ is not added to the flue gas 12 in the flue gas duct 19.

As described above, according to the air pollution control apparatus 10 of the present embodiment, the denitration catalyst layer 13 that removes NOx in the flue gas 12 from the boliler 11, and atomizes HCl into the flue gas 12 to oxidize Hg is provided. The swirling-flow generating member 30A including the swirling-flow generating-member body 31 being partitioned to correspond to each of the passages 28 on the inlet 13a side of the denitration catalyst layer 13, and the swirling-flow generating vanes 33A arranged on the partition inner walls 32 to generate a turbulent flow is provided on the inlet 13a side of the denitration catalyst layer 13. With this configuration, a laminar flow of the flue gas 12 in the flue gas duct 19 can be changed to a swirling flow inside the denitration catalyst layer 13 to increase the contact time between the flue gas 12 and the denitration catalyst. Because HCl has been supplied beforehand into the flue gas 12, the oxidation reaction efficiency between Hg in the flue gas 12 and the denitration catalyst can be improved. As a result, in the air pollution control system applying the air pollution control apparatus 10 according to the present embodiment, Hg can be removed highly efficiently by the desulfurizer (not shown) provided on a downstream side of the air pollution control apparatus 10.

Further, because reduction performance of NOx and oxidation performance of Hg in the flue gas 12 can be improved, the amount of denitration catalyst to be used in the denitration catalyst layer 13 can be decreased, and the amount of HCl to be supplied to the flue gas 12 can be also decreased.

The present embodiment has been explained above by using flue gas discharged from a boiler of a thermal power plant that burns fossil fuel including sulfur, Hg and the like, such as coal and heavy oil. However, the present invention is not limited thereto, and can be applied to flue gas having a low concentration of NOx and containing carbon dioxide, oxygen, SOx, dust, or moisture, boiler flue gas discharged from a factory or the like that burns fuel containing sulfur, Hg and the like, and heating furnace flue gas discharged from a metal factory, a petroleum refining plant, a petrochemical plant and the like.

INDUSTRIAL APPLICABILITY

As described above, the air pollution control apparatus according to the present invention is suitable to be used in processing of flue gas discharged from an apparatus that burns fossil fuel such as coal and heavy oil containing mercury, in a thermal power plant and the like, because a swirling-flow generating member is provided at an inlet of a denitration catalyst layer to change a laminar flow of flue gas in a flue gas duct to a swirling flow inside the denitration catalyst layer, thereby increasing the contact time between the flue gas 12 and the denitration catalyst to improve the oxidation reaction efficiency between mercury and the denitration catalyst is improved.

REFERENCE SIGNS LIST 10 air pollution control apparatus
11 boiler
12 flue gas
13 denitration catalyst layer
13a inlet
19 flue gas duct
20 hydrochloric acid (liquid HCl) supplying unit
21 hydrogen chloride (HCl) atomizing unit
22 hydrogen chloride (HCl) atomizing nozzle
23 ammonia ($NH_3$) supplying unit
24 ammonia ($NH_3$) atomizing nozzle
28 passage
30A, 30A-1 to 30A-3, 30B swirling-flow generating member
31 swirling-flow generating-member body
32 inner wall
33A, 33B swirling-flow generating vane

The invention claimed is:

1. An air pollution control apparatus having at least one denitration catalyst layer that removes nitrogen oxides in flue gas from a boiler and atomizes hydrogen chloride into a flue gas duct of the flue gas to oxidize mercury, wherein
   a swirling-flow generating member is provided at an inlet of the denitration catalyst layer to change a laminar flow of flue gas in a flue gas duct to a swirling flow inside the denitration catalyst layer, wherein
   the denitration catalyst layer is a honeycomb catalyst, and
   the swirling-flow generating member includes a swirling-flow generating-member body being partitioned to correspond to each passage at an inlet of the honeycomb catalyst, and a plurality of swirling-flow generating vanes arranged on the partition inner walls to generate a turbulent flow.

2. The air pollution control apparatus according to claim 1, wherein the swirling-flow generating vanes provided on the inner walls form a set, and a plurality of sets are arranged in a direction of a gas flow, while being offset.

3. The air pollution control apparatus according to claim 1, wherein
   the denitration catalyst layer is provided at a plurality of stages along a flow direction of the flue gas, and
   the swirling-flow generating member is arranged at each of the stages.

4. An air pollution control system comprising:
a boiler;
a chlorinating-agent supplying unit that injects a chlorinating agent into flue gas discharged to a flue gas duct on a downstream side of the boiler;
the air pollution control apparatus according to claim 1;
a desulfurizer that removes sulfur oxides in flue gas after denitration; and
a stack that discharges denitrated gas to outside.

5. The air pollution control system according to claim 4, wherein an ammonia supplying unit that injects ammonia into flue gas discharged to a flue gas duct on a downstream side of the boiler is provided.

* * * * *